(12) United States Patent
Thrithala

(10) Patent No.: US 9,674,592 B2
(45) Date of Patent: Jun. 6, 2017

(54) MINI-OPTICAL NETWORK TERMINAL (ONT)

(75) Inventor: Govindan Kutty Thrithala, Bangalore (IN)

(73) Assignee: Tejas Networks Limited, Bangalore (IN)

( * ) Notice: Subject to any disclaimer, the term of this patent is extended or adjusted under 35 U.S.C. 154(b) by 95 days.

(21) Appl. No.: 13/261,748

(22) PCT Filed: Aug. 11, 2011

(86) PCT No.: PCT/IN2011/000531
§ 371 (c)(1),
(2), (4) Date: Jan. 20, 2016

(87) PCT Pub. No.: WO2012/127488
PCT Pub. Date: Sep. 27, 2012

(65) Prior Publication Data
US 2016/0150302 A1    May 26, 2016

(30) Foreign Application Priority Data
Mar. 22, 2011    (IN) .............................. 892/CHE/2011

(51) Int. Cl.
H04B 10/00    (2013.01)
H04Q 11/00    (2006.01)
H04B 10/40    (2013.01)
H04L 29/06    (2006.01)

(52) U.S. Cl.
CPC ......... *H04Q 11/0071* (2013.01); *H04B 10/40* (2013.01); *H04L 69/18* (2013.01); *H04Q 11/0067* (2013.01)

(58) Field of Classification Search
CPC .............. H04B 10/40; H04Q 11/0071; H04Q 11/0067; H04L 69/18
See application file for complete search history.

(56) References Cited

U.S. PATENT DOCUMENTS

| | | | |
|---|---|---|---|
| 2008/0320200 A1* | 12/2008 | Pederson | H04B 10/1143 710/305 |
| 2010/0067908 A1* | 3/2010 | Weitz | H04L 49/90 398/58 |
| 2011/0246681 A1* | 10/2011 | Lai | G06F 13/4081 710/16 |
| 2013/0022132 A1* | 1/2013 | Paulsen | H04B 3/54 375/257 |
| 2016/0150302 A1* | 5/2016 | Thrithala | H04B 10/40 398/45 |

* cited by examiner

*Primary Examiner* — Danny Leung
(74) *Attorney, Agent, or Firm* — Oliff PLC

(57) ABSTRACT

The present invention relates to passive optical network (PON), and in particular, to an optical network terminal (ONT) in the PON system. In one embodiment, the optical network terminal includes a first interface coupled to a communications network, a second interface coupled to a network client and a processor including a memory coupled to the first interface and to the second interface, wherein the processor is capable of converting optical signals to electric signals, such that the network client can access the communications network.

7 Claims, 4 Drawing Sheets

MINI-OPTICAL NETWORK TERMINAL (ONT)

REFERENCE TO RELATED APPLICATIONS

The present application is a national stage of International Patent Application PCT/IN2011/000531, filed 11 Aug. 2011, which claims the benefit of Indian Patent Application Ser. No. 892/CHE/2011, filed 22 Mar. 2011, all of which are hereby incorporated by reference.

FIELD OF THE INVENTION

The present invention relates to the field of passive optical network (PON), and in particular, to an optical network terminal (ONT) in the PON system.

BACKGROUND OF THE INVENTION

A network interface device permits a subscriber to access a network. A passive optical network (PON) is an example of a network capable of delivering voice, video and other data among multiple network subscribers, using a common optical fiber link. Passive optical splitters and combiners enable multiple optical network terminals (ONTs) to share the optical fiber link. In a PON, each ONT terminates the optical fiber link for a residential or business subscriber, and is sometimes referred to as a subscriber premises node that delivers Fiber to the Premises (FTTP) services.

An ONT is connected to one or more subscriber devices, such as televisions, set-top boxes, telephones, computers, or network appliances, which ultimately receive the voice, video and data delivered vii the PON. An ONT is an example of a network interface, device. Other examples of a network interface device, in different network types, include cable modems and digital subscriber line (DSL) boxes.

Generally, a network also includes a network access interface. In a PON, the network access interface is sometimes referred to as an optical line terminator (OLT), having multiple, independent PON interface modules that serve multiple optical fiber links. A PON interface module provides an interface for transmission and reception of data packets over a particular optical fiber link that serves a group of ONTs. A PON is a downstream-multicast medium. Each packet transmitted on an optical fiber link can be received by every ONT served by that link. ONTs identify selected packets or frames on the fiber link based on addressing information included within the packets or frames.

Network equipment, such as network interface devices, in a cable or hybrid network may be connected to power provided by a central office (CO), which commonly utilizes battery and generator back-up power to maintain a continuous power supply. In contrast, an ONT in an all-fiber optic network is ordinarily powered locally at the subscriber premises. For this reason, an ONT often includes a battery to provide backup power during a power outage to maintain critical services, such as voice service.

Conventionally, the fibre of a PON typically terminates at a street cabinet to be shared by a number of subscriber equipment. The street cabinet houses an optical network terminal (ONT). The last few meters or kilometer from the street cabinet to a subscriber's home is typically bridged using existing twisted pair copper cables or radio links. The bandwidth resources of the fibre to the street cabinet are typically shared amongst a group of subscribers using an Ethernet switch. For example the fibre may extend to a street cabinet, a kerb outside a subscribers home, or directly into the subscribers home itself. Due to the bulkiness, size and complexity of the ONT cabinets are all factors that increase design difficulty and accrue additional costs. Also, the ONT itself is valuable, and its mounting on a wall, especially outside, makes it susceptible to theft or to being accidentally knocked down.

Therefore, it would be desirable to have a compact optical network terminal to make passive optical networks seamlessly connected to regular computers and any other systems to overcome the above restrictions.

SUMMARY OF THE INVENTION

An aspect of the present invention is to address at least the above-mentioned problems and/or disadvantages and to provide at least the advantages described below.

Accordingly, an aspect of the present invention is to provide a compact optical network terminal, comprising a first interface coupled to a communications network, a second interface coupled to a network client and a processor including a circuitry and a memory coupled to the first interface and to the second interface, wherein the processor is capable of converting optical signals to electric signals, such that the network client can access the communications network.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Figure 1A:
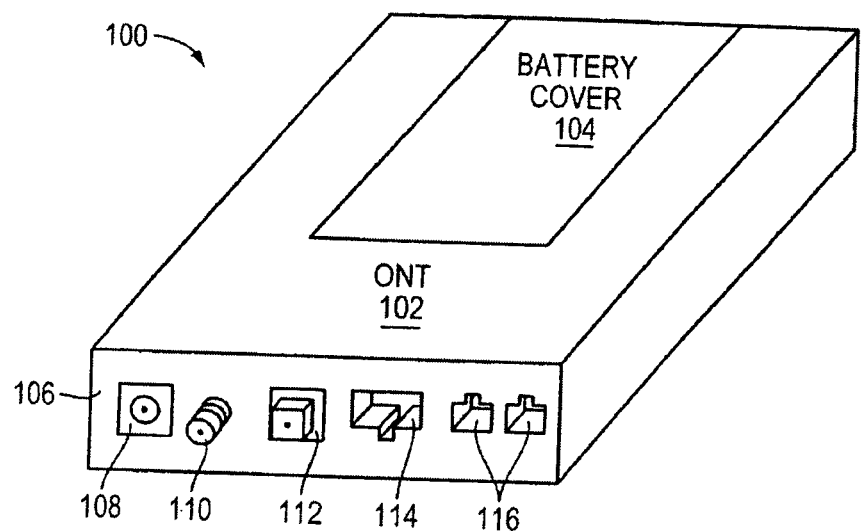
FIG. 1A is a mechanical diagram of an optical network terminal (ONT) typical of customer premises equipment (CPE).

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAIL DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 4, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1A shows an optical network terminal (ONT) 100, which is an example of customer premises equipment (CPE), that connects a customer's communications equipment, e.g., computers, telephones, and televisions, to a telecommunications service provider. The ONT 100 includes an outer case 102 with an engagable cover 104 that covers a battery compartment (not shown) or another cavity of the ONT 100. A face 106 of the ONT 100 carries various connectors, including a power connector 108, coaxial cable connector 110, fiber optic cable connector 112, Ethernet (CAT-5) connector 114, and two telephone connectors 116. The ONT 100 transmits data to and receives data from a telecommunications network (not shown) via a fiber optic cable (not shown) connected to a fiber optic cable connector 112. Televisions, computers, and telephones on the customer's premises may be connected to the coaxial cable connector 110, Ethernet connector 114, and telephone connectors 116, respectively, on the ONT 100.

Figure 1B:
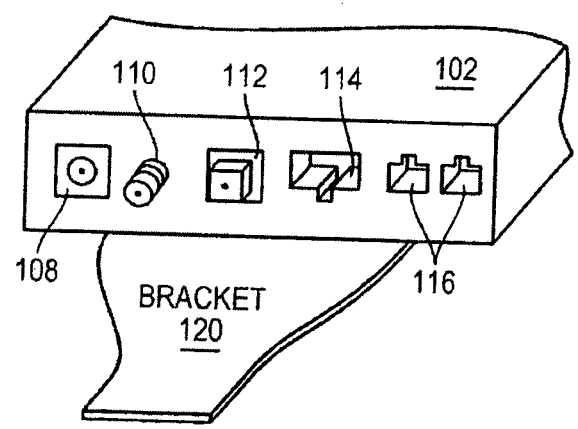
FIG. 1B is a mechanical diagram of the ONT of FIG. 1A attached to a mounting bracket.

FIG. 1B shows the ONT 100 of FIG. 1A with connector details with a bracket 120 attached to the outer case 102. The bracket 120 may be mounted to a wall (not shown), and the ONT 100 may be hung on the bracket. In many applications, the bracket 120 is installed on an exterior wall of a building or inside a garage, locations at which the ONT may be exposed to large temperature variations and different weather conditions.

Figure 2:
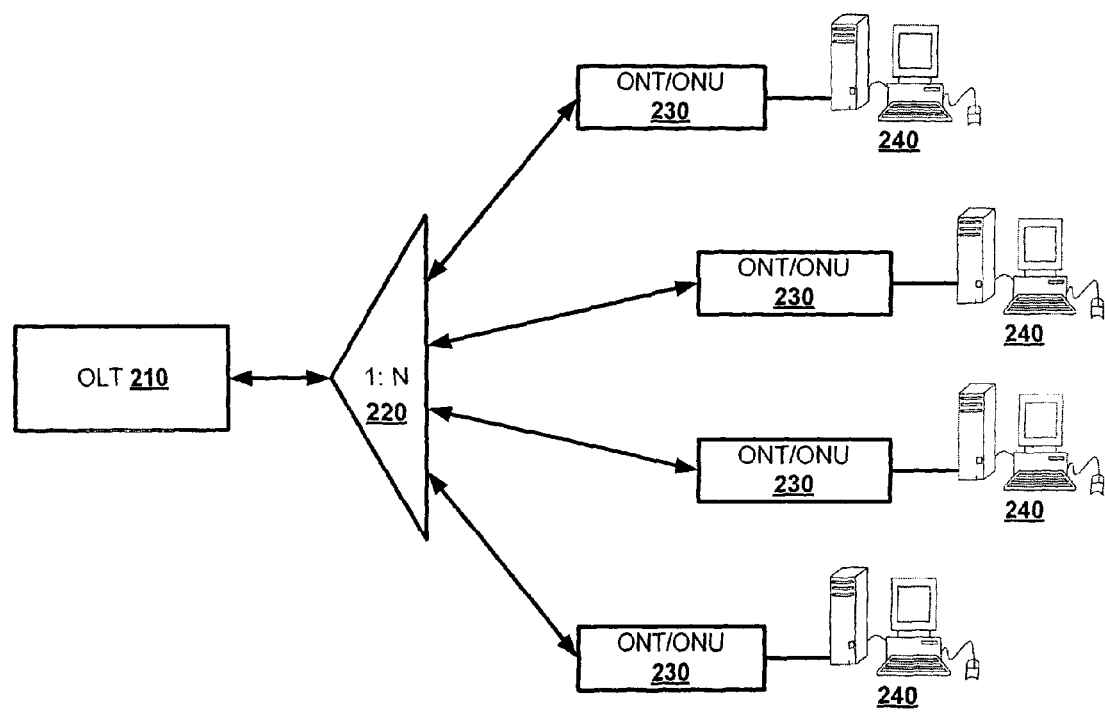
FIG. 2 shows a typical Passive Optical Network (PON) Architecture.

FIG. 2 shows a general Passive Optical Network (PON) Architecture. The elements of a PON are (i) Optical Line Terminal (OLT) 210 (ii) Passive Optical Splitter 220 and (iii) Optical Network Unit (ONU) 230. The Optical Line Terminal 210 is the main element of the network and is usually placed in the Local Exchange. It is a network element with PON line card, basically a aggregation switch. It works as an interface between core network and PON network.

Optical Splitter 220 is a passive device with single input and multiple outputs. Optical power at input is split evenly between outputs. Not only signal travels from input to the outputs, signal can also travel from the output to the input. Splitters can be placed anywhere in between Central Office (CO) and Subscriber premises. It is used to connect an optical port of OLT with multiple subscribers.

Optical Network units (ONUs) 230 serve as an interface to the network and are deployed at customer premises 240. It provides several interfaces for accessing triple play services and in the upper side it connects with the OLT via optical splitter.

Although PONs can exist in three basic configuration (tree, bus and ring), the tree topology is favored due to smaller variation in the signal power from different end station. PON uses 1490 nm for the downstream wavelength and 1310 nm for the upstream wavelength. Signals are inserted or extracted from the fibre using a coarse wavelength division multiplexer (CWDM) filter at the CO and subscriber premises.

Figure 3:
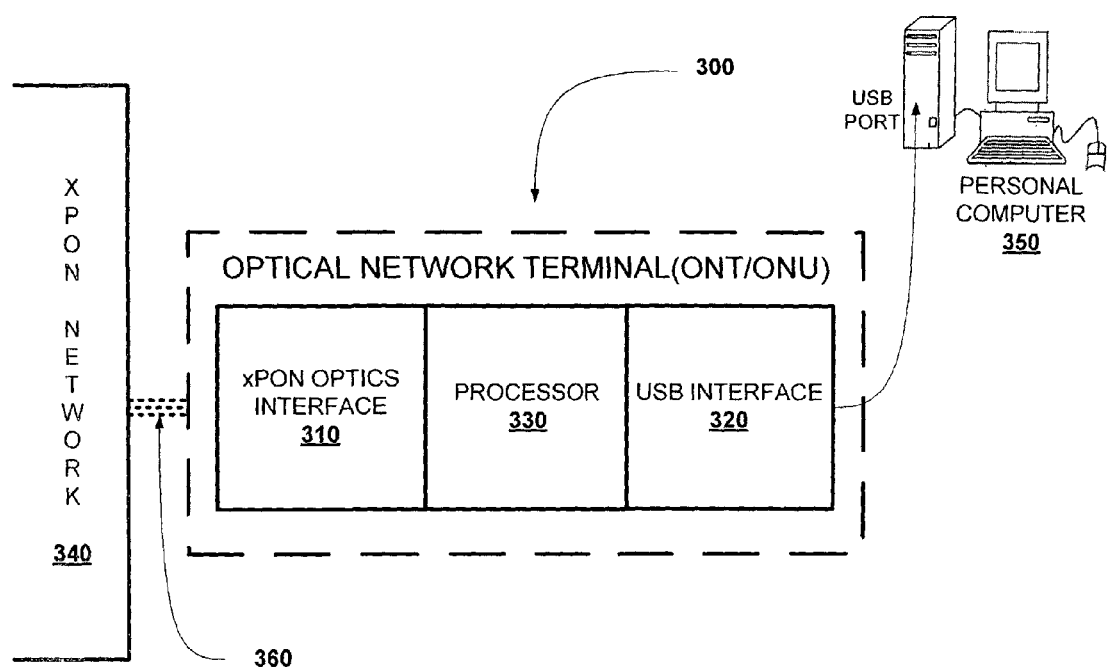
FIG. 3 shows a compatible optical network terminal (ONT) according to one embodiment of the present invention.

FIG. 3 shows a compatible optical network terminal (ONT) according to one embodiment of the present invention. The optical network terminal (ONT) 300 includes a first interface 310, a second interface 320 and a middle region 330 sandwiched between the first and second interface. The first interface 310 coupled to a communications network 340, a second interface 320 coupled to a network client 350. The first interface is connected through a dedicated optical fiber link 360 (bi-directional) to receive optical signals from one or more communication network 340. The communication network may be or may include one or more but not limited to any of the xPON network 340 (e.g. of a broadband passive optical network (BPON), a gigabit-capable passive optical network (GPON), an Ethernet passive optical network (EPON), a gigabit-capable Ethernet passive optical network (GEPON), an active Ethernet optical network and any other future passive optical networks etc). The second interface 320 is coupled to the network client 350 though a USB port.

In an operation, the middle region which may be a processor 330 including a memory (not shown in figure) coupled to the first interface 310 and to the second interface 320, wherein the processor 330 includes a circuitry which is configured for converting optical signals to electric signals, such that the network client can access the communications network. The first interface 310 may include an optical module (not shown in figure) which receives optical signals via the optical fiber link 360 and capable of converting the optical signals to electrical signals. The second interface 320 may include a control circuit (not shown in figure) which is capable of receiving the power from the network client 350 for processing the received electrical signals thereby reducing the required protocol processing time from the network client. Due to this behavior of the second interface 320 results in simplifying the ONT design by offloading the "non-volatile" part of the software to the network client 350 and downloading it on power to turn it. Most of the backend work can also be done by a software driver residing in the network client. Further, the second interface 320 acts as a network connectivity dongle with an optical transceiver at one end. Furthermore, the second interface may include a Universal Serial Bus (USB) jack which is couplable to Universal Serial Bus (USB) plug or connector of the network client 350. The second interface 320 capable of power up the "dongle" to connect it to the central office or Optical Line Terminal (OLT) by excluding external power source as required in the conventional design of ONT.

In an example operation the Optical Network Terminal. (ONT) is connected to the network client through a USB port. Once the USB port of the network client 360 is coupled to the USB interface i.e. second interface 320, one or more driver needs to be installed at the network client 360 which then onwards controls the USB dongle (ONT) with the configured parameters at the installation time. The software boots up the USB dongle and communicates to network client 360 as a memory device with a built-in driver. The xPON protocol selected at the network client 360 will run and then converts the data coming from the WAN/LAN side to network client 360 as a network device. Once the software starts running in the network client 360, it would get connected to the OLT using the required xPON protocol.

Once the network client 360 and the xPON network are connected, each network client 360 will have a dedicated connection (e.g. speed, bandwidth etc) as requested or selected by the client side. By this kind of novel and compatible design i.e. having xPON interface on one side and USB protocol interface on the other side will eradicate the necessity of the external power for the ONT. Also, by this kind of compatible design reduce the unnecessary splitting of equal upstream wavelength to all the network clients in the network. The network client may be or may include a host computer, a optical network unit, a optical network terminal or any other unit or terminal or device which is capable of accessing the passive optical network (xPON).

Figure 4:
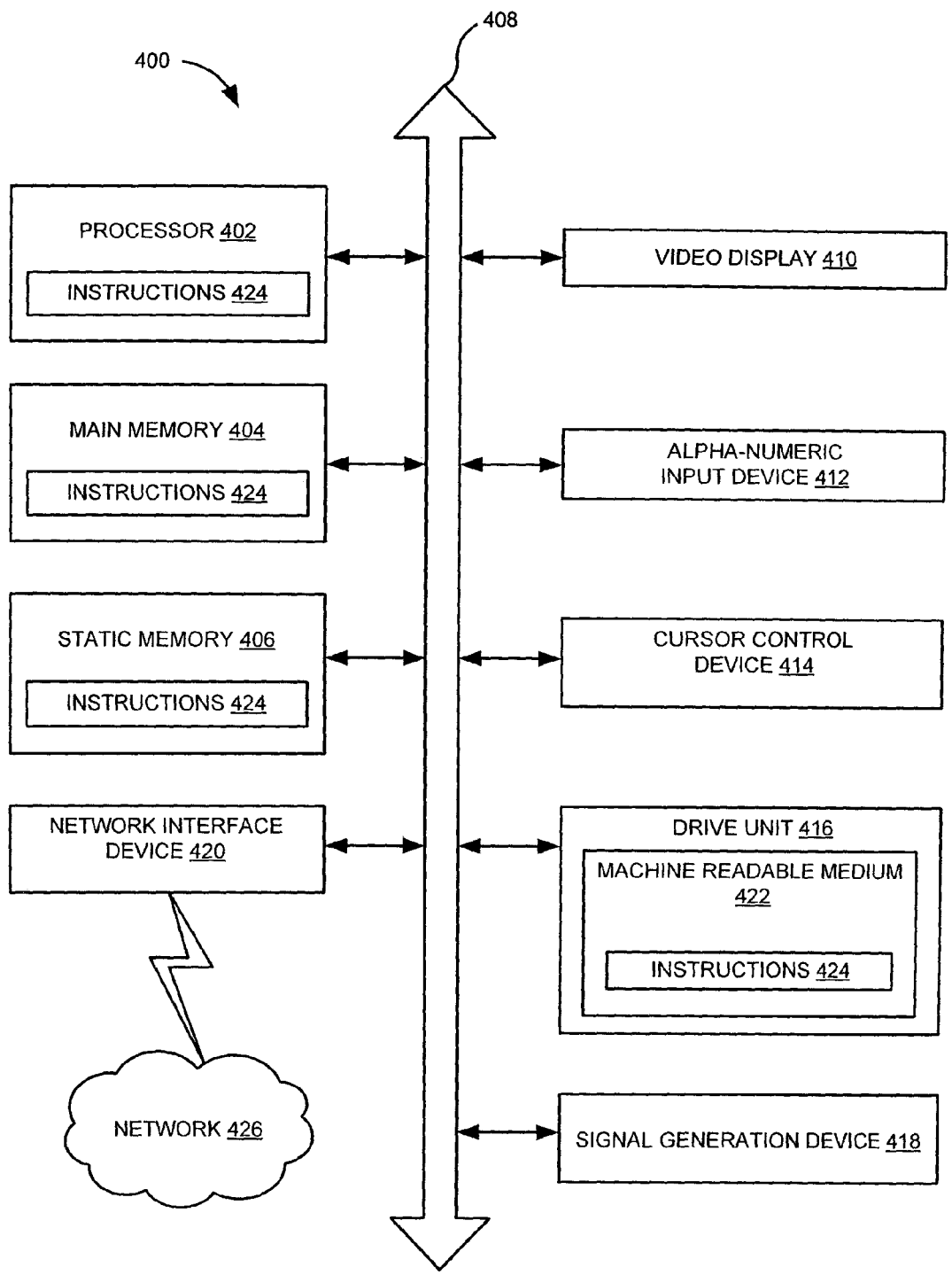
FIG. 4 is a diagrammatic system view of a data processing system in which any of the embodiments disclosed herein may be performed.

FIG. 4 is a diagrammatic system view 400 of a data processing system in which any of the embodiments disclosed herein may be performed, according to one embodiment. Particularly, the diagrammatic system view of FIG. 4 illustrates a processor 402, a main memory 404, a static memory 406, a bus 408, a video display 410, an alphanumeric input device 412, a cursor control device 414, a drive unit 416, a signal generation device 418, a network interface device 420, a machine readable medium 422, instructions 424 and a network 426.

The diagrammatic system view 400 may indicate a personal computer and/or a data processing system in which one or more operations disclosed herein are performed. The processor 402 may be a microprocessor, a state machine, an application specific integrated circuit, a field programmable gate array; etc. (e.g., Intel® Pentium® processor). The main memory 404 may be a dynamic random access memory and/or a primary memory of a computer system. The static memory 406 may be a hard drive, a flash drive, and/or other memory information associated with the data processing system.

The bus 408 may be an interconnection between various circuits and/or structures of the data processing system. The video display 410 may provide graphical representation of information on the data processing system. The alphanumeric input device 412 may be a keypad, keyboard and/or any other input device of text (e.g., a special device to aid the physically handicapped). The cursor control device 414 may be a pointing device such as a mouse. The drive unit 416 may be a hard drive, a storage system, and/or other longer term storage subsystem.

The signal generation device 418 may be a bios and/or a functional operating system of the data processing system. The network interface device 420 may perform interface functions (e.g., code conversion, protocol conversion, and/or buffering) required for communications to and from the network 426 between a number of independent devices (e.g., of varying protocols). The machine readable medium 422 may provide instructions on which any of the methods disclosed herein may be performed. The instructions 424 may provide source code and/or data code to the processor 402 to enable any one/or more operations disclosed herein.

FIGS. 1-4 are merely representational and are not drawn to scale. Certain portions thereof may be exaggerated, while others may be minimized. FIGS. 1-4 illustrate various embodiments of the invention that can be understood and appropriately carried out by those of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively.

I claim:

1. A compact optical network terminal, comprising:
   a first interface coupled to a communications network, wherein the first interface includes an optical module that receives optical signals via an optical fiber link and converts the optical signals to electrical signals, wherein the optical module is selectively configurable to support at least two network architectures among a plurality of network architectures;
   a second interface coupled to a network client, wherein the second interface is a network connectivity dongle with an optical transceiver at one end; and
   a processor including a circuitry and a memory coupled to the first interface and to the second interface, wherein the processor provides instructions to the first interface for converting the optical signals to the electric signals, such that the network client can access the communications network thereby reducing splitting of equal upstream wavelengths to all the network clients in the network.

2. The optical network terminal of claim 1, wherein the plurality of network architectures includes a broadband passive optical network (BPON), a gigabit-capable passive optical network (GPON), an Ethernet passive optical network (EPON), a gigabit-capable Ethernet passive optical network (GEPON) and an active Ethernet optical network.

3. The optical network terminal of claim 1, wherein the network client includes a converter unit for converting at least some of the electrical signals to data units which is selectively configurable to support a plurality of optical network protocols.

4. The optical, network terminal of claim 1, wherein the second interface includes a control circuitry which is capable of receiving the power from the network client for processing the received electrical signals thereby reducing the required protocol processing time from the network client.

5. The optical network terminal of claim 1, wherein the network client is capable of processing the xPON protocols to communicate with one or more Optical Line Terminal (OLT).

6. The optical network terminal of claim 1, wherein the second interface includes a Universal Serial Bus (USB) jack which is coupleable to Universal Serial Bus (USB) plug or connector of the network client.

7. The optical network terminal of claim 1, wherein the at least one communication service with the xPON network comprises a first communication service and a second communication service, and wherein the communication service includes at least one voice communication service, a data communication service, and a video service.

* * * * *